T. BRÁZDA, E. RICHTER & A. SCHÜCKHER.
PROCESS FOR PREVENTING THE FORMATION OF BOILER SCALE.
APPLICATION FILED SEPT. 19, 1912.
1,059,431.
Patented Apr. 22, 1913.
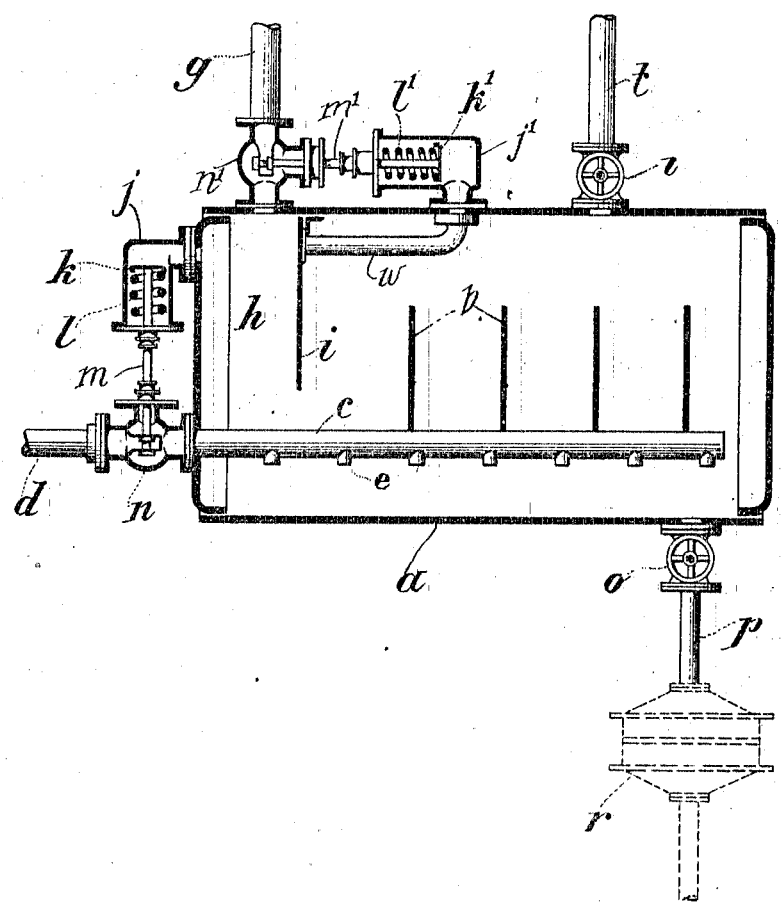
Witnesses.
Inventors.
Theodor Brazda
Emil Richter
Albert Schückher
by Foster Freeman Watson Coit
Attorneys.

UNITED STATES PATENT OFFICE.

THEODOR BRÁZDA, OF PILSEN, AND EMIL RICHTER AND ALBERT SCHÜCKHER, OF VIENNA, AUSTRIA-HUNGARY.

PROCESS FOR PREVENTING THE FORMATION OF BOILER-SCALE.

1,059,431.  Specification of Letters Patent.  Patented Apr. 22, 1913.

Application filed September 19, 1912. Serial No. 721,281.

*To all whom it may concern:*

Be it known that we, THEODOR BRÁZDA, subject of the Emperor of Austria-Hungary, residing at Pilsen, Bohemia, Austria-Hungary, and EMIL RICHTER and ALBERT SCHÜCKHER, subjects of the Emperor of Austria-Hungary, residing at Vienna, Austria-Hungary, have invented certain new and useful Improvements in a Process for Preventing the Formation of Boiler-Scale, of which the following is a specification.

The object of the U. S. Patent No. 925283 is a process for preventing the formation of boiler scale in which the feed water, without addition of chemicals, is boiled with simultaneous vigor stirring in a container, which is not quite filled, which is closed on all sides and does not stand under the pressure of the feed pump or the boiler, with the object of precipitating part of the substances causing hardness in the form of a fine mud, suspended in the water, when the feed water is introduced into the boiler with this suspension or the precipitate obtained therefrom alone. The necessary energetic motion of the water during boiling can be effected either by the steam itself or with the aid of mechanical stirrers. This process is based on the fact that the micro-crystalline precipitate which results in this treatment is capable, on account of its particular condition, of preventing deposition on the walls of boilers and the like, because the precipitate which commences to crystallize out in the boiler at increasing concentration forms no boiler scale under the influence of the suspension which has been added. On the contrary, these precipitates are also of great fineness and mobility, they follow all the movements of the water and at a certain over-concentration form a soft, pasty sludge, which can be removed by periodic drawing off from the boiler.

It was originally attempted, to attribute the surprising action of the process to the easily mobile fine particles of the suspension suspended in the boiler water continually rubbing on the walls of the boiler and on the deposits in course of formation in the boiler, whereby these deposits were not allowed to lie still and were thus hindered from becoming solid. Another more plausible attempt at explanation is that these most finely divided crystals previously present in the boiler water serve in a certain manner as crystallization points or crystal nuclei for the substances causing permanent hardness, which separate out later in the boiler. The suspensions precipitated by boiling the water with vigorous stirring mainly consist of bicarbonates. The substances causing the permanent hardness, in which sulfates are principally concerned, in consequence of their great solubility first begin to separate out, when the solution has attained the corresponding degree of concentration by evaporation and enrichment in consequence of fresh addition of water containing sulfates. The small crystals of carbonate introduced into the boiler water, which take part in all the movements of the same, attract to themselves the sulfates, which crystallize out in somewhat the same manner as sugar begins to crystallize out from a saturated solution on to a crystal which is hung therein. Thus by the excessively fine carbonate crystals suspended in all parts of the boiler water the sulfates are actively prevented from forming a solid deposit on the walls of the boiler.

The present invention has for its object a further development of this process. This further development of the original process aims first at carrying out by the simplest possible means the process of boiling the water with energetic stirring during continuous working. To this end according to the present invention, the water which is to be treated, is added continuously, or intermittently at short time-intervals, to a closed container, which is not wholly filled, and is led from the container in the same manner, and as it flows is boiled and kept in motion so vigorously that the precipitate settles out in the desired fineness. The water is usually introduced by a pump or by a suitable high reservoir. The boiled water can be likewise led from the container to the boiler by a pump unless it is preferred to feed the water into a collector and to feed it to the boiler therefrom.

In treatment in continuous working in order to secure the deposition of the precipitate in the required microcrystalline condition and fine division, on which indeed the working of the whole process depends, it is advisable to conduct this treatment of the water in several consecutive phases. To this end the process can be carried out in a single container in which suitably formed baffle-plates are disposed which force the water during the energetic stirring to run in a current of heating places situated one after another. But several containers, placed one after the other can also be employed.

The energetic stirring of the water, which is essential for the process, can be obtained in various ways, as was mentioned at the beginning. If the source of heat is outside the container the vigorous movement of the water is effected by the aid of mixing wheels, stirrers or the like, disposed inside the container. If the heating of the water is effected by allowing steam to pass directly into it, this steam, by means of suitable devices, can simultaneously serve to bring about the requisite energetic motion.

Devices have been previously proposed to effect the prior warming of the water by direct admixture of steam with the feed water, (for example, by leading in the steam in fine jets, or with the so-called noiseless heaters), but these have always been concerned only with an improvement in giving up heat to the water. To ascribe directly to the steam the function of a stirring medium has first been proposed toward the solution of the problem of generating, by intensely dashing the water particles together, a precipitate of microcrystalline condition, whose finest particles are first rendered distinctly visible on considerable magnifications, which turbidity, whether suspended in the boiler water or added as such to the boiler water, forms an active means for preventing the formation of boiler scale.

As a further development of the process it has proved advantageous to cause the admission into the water container of the steam or water or both to take place in intermittent puffs (pulsating). The pulsating, in comparison to the continuous steam inflow, results in an increased agitation of the water. The pulsating, in comparison to the continuous, inflow of water causes the pressure variations in the container to take place within wider limits, whereby the pulsation of the current of steam is essentially increased. This pulsating inflow of steam or water can be effected either with the aid of mechanical means or it can be brought into play by the pressure variations occurring in the container. The flow of the steam into the container in puffs can also be effected by the streaming of the water run into or out from the container; for example by arranging in the in- or out-flow a wheel with vanes or the like, whose movement is transmitted to a cut-off or regulating organ inserted in the steam pipe. To make the stirring of the water sufficiently active there is still available the method of increasing the stirring action of the steam flowing into the water by combination with mechanical stirring means, in that the steam pipe fixed in the container is provided with stirring vanes and arranged as a stirring axle.

The gases chemically bound in the water and evolved in the precipitation process are driven out by boiling the water under vigorous stirring, the principal quantity of which collecting in the upper part of the container above the level of the liquid and can thereupon be blown out of the container. There is distinct importance in this action in the process, for it avoids the attack on the material of the boiler which otherwise takes place and avoids the origination of corrosion. Now it has been found advantageous, especially in carrying out the process in continuous working, to allow this blowing off of the gases to occur periodically, i. e. in puffs. In this way the gases which are not immediately at the blow-off opening and those which are in the deeper layers are carried off by the puffing action, so that the water passes into the boiler completely freed from air and gases. The periodic blowing-off can be effected by hand or automatically by suitable devices at the requisite time-intervals.

To carry out the process according to this invention the mechanism disclosed in the accompanying drawing may be utilized but it is to be understood that the device shown is only illustrative and may be modified as required under varying conditions. A container $a$ is connected by means of the pipe $g$ to a source of water supply and the pipe $d$ supplies steam to the container $a$ from a suitable source. The pipe $d$ terminates within the container in a section $c$ which is provided with a plurality of suitably situated exits $e$. A plurality of intermediate walls or baffle plates $b$ force the water to traverse a number of chambers in series as the untreated water flows from the admission opening to the discharge opening and prevent the water from leaving the container $a$ before being sufficiently boiled and treated. The pipe $g$ discharges into a space $h$ which is separated from the other space of the container $a$ by a wall $i$ leaving sufficient opening for the discharge from the chamber $h$.

A casing $j$ on the exterior of the container $a$ communicates with the chamber $h$ and contains a piston $k$ one face of which is under the pressure prevailing in the chamber $h$ and the piston face is balanced against this pressure by a suitable spring $l$ or an equivalent device. A rod $m$ connects the piston with a cut-off valve $n$ controlling the steam supply from the pipe $d$. When the steam pressure within the container $a$ reaches a sufficient value to operate the piston $k$ the rod $m$ is moved against the tension of the spring $l$ and the cut-off $n$ is closed preventing further admission of steam. As soon as the steam is condensed in the space $h$ by the inflowing water the pressure rapidly diminishes there so that the spring $l$ predominates and the valve $n$ is opened, again admitting steam. The space $h$ being separated from the rest of the container $a$, and proportionately smaller, a quicker action of the water on the steam is obtained to bring about a frequent change of pressure and thereby also a sufficiently rapid pulsation of the steam. The water supply is also regulated in a similar manner and its admission may be pulsated by the provision of the pipe $w$ communicating with the chamber $h$ and with the chamber $j'$ on the exterior of the container $a$. Piston $k'$ and spring $l'$ work within the casing $j'$ to operate a rod $m'$ for opening and closing valve $n'$ in the water supply pipe $g$. By this means both the steam and water supply are regulated by the pressure prevailing in the chamber $h$. This regulation takes place in such a manner that with a predetermined reduction in pressure in the chamber $h$, the steam valve $n$ is opened and a corresponding increase in pressure opens the water valve $n'$ by the pulsating inflow of the steam and water and essentially intensive agitation of the water is attained.

The boiled water leaves the container $a$ at the lower end through the pipe $p$ provided with a cut-off valve $o$. A filter $r$ may be provided to hold back the precipitated suspended matter. A means for drawing off the mud may also be provided. A pipe $t$ with a cut-off valve $v$ serves to permit the blowing off of the gases collecting in the upper part of the container $a$.

Claims.

1. The herein described method of preventing the formation of boiler scale which consists in simultaneously admitting water to and drawing it off from a container and injecting steam directly into said water at a plurality of points as it passes through said container to vigorously agitate and heat substantially all parts of said water and in rapidly and intermittently interrupting the flow of fluid entering the container to cause pulsations and assist in the agitation.

2. The herein described method for preventing the formation of boiler scale by the continuous treatment of feed water as it moves through a container between the source of supply and the boiler to which it is fed which comprises simultaneously heating and vigorously agitating substantially all of the particles of the entire body of water in the container as the entire body moves through the container on its way to the boiler whereby the scale forming substances are separated and suspended in said water in a finely divided state before being introduced into the boiler with the water.

3. The herein described method of preventing the formation of boiler scale which consists in admitting water to and drawing it off from a container and injecting steam directly into said water as it passes through said container to simultaneously heat and vigorously agitate said water, and in rapidly and intermittently interrupting the flow of fluid entering the container to cause pulsations of said fluid and assists in the agitation of the water.

In testimony whereof we have affixed our signatures in presence of two witnesses.

THEODOR BRÁZDA.
EMIL RICHTER.
ALBERT SCHÜCKHER.

Witnesses:
  AUGUST FUGGER,
  DR. RICHARD PECK.